United States Patent Office 2,984,502
Patented May 16, 1961

2,984,502
COUPLING DEVICE
Benjamin I. Tyrrell, 145 W. Weber Ave., Stockton, Calif.
Filed May 25, 1960, Ser. No. 31,753
2 Claims. (Cl. 280—506)

This invention relates to a coupling for detachably connecting tractor and trailer vehicles.

It is an an object of this invention to provide a coupling which, without adjustment, may be used with trailer hitches and tongues of varying sizes.

It is a further object of this invention to provide a trailer tongue eye which is provided with means for automatically compensating for wear in the tongue eye, thus to ensure means for providing a tight coupling between the tractor and trailer even after the tongue or eye has become worn through use.

Further objects and advantages of this invention, if not specifically set forth, will become apparent during the course of the description which follows.

Generally, this invention concerns a vehicle coupling comprising a generally U-shaped loop attachable to a trailer tongue, the U-shaped loop having a housing secured at the open end thereof. There is provided a throat piece slidable within the housing into the center of the loop, and the throat piece has a spring mounted therein at the end of the throat piece farthest removed from the loop, the spring extending slightly beyond said end of the throat piece. The housing is provided with an opening passing therethrough, the axis of the opening being parallel to the axis of the tongue used with the coupling. The opening is in the area normally occupied by the rearward end of the said throat piece. There is also provided a wedge of a size adapted to pass partially through the opening wherein it is gripped by the spring supported by the throat piece and the rear wall of the opening, thus to urge the throat piece into the center of the U-shaped loop.

Figure 1:
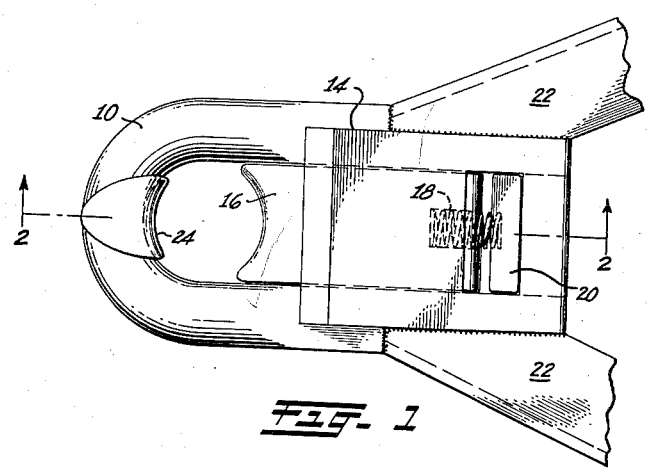
Figure 1 is a plan view of the coupling eye as the same appears when secured to the draft-member or tongue.
Figure 2:
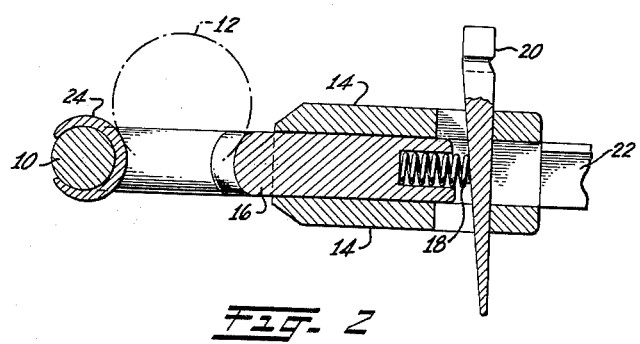
Figure 2 represents a sectional side elevation taken along the line 2—2 of Figure 1.

Referring now to the drawings wherein like characters refer to like parts throughout, there is shown a vehicle coupling, including a generally U-shaped loop 10 which may be caused to surround partially a trailer hitch 12. The loop is of a suitable cast alloy material such as is customarily used in the manufacture of trailer tongue eyes. At the open end of the U-shaped loop are a pair of plates 14 which may be cast integral with the loop 10 and which together constitute a housing which aids in maintaining the throat piece 16 in position. The throat piece is loosely mounted for sliding movement into and out of the center of the eye. The throat piece is provided, at the end thereof farthest removed from the loop, with a suitable female receptacle for a spring 18. The rearward (exposed) end of the spring lies more or less along the center of the axis of a passage (particularly seen in Figure 2) through the housing. Wedge 20 is placed in the passage so that the forward face thereof bears against the rearward end of the spring 18 and the rearward face thereof bears against the inner rear walls formed by housing plates 14. Welded to the rear portions of the arms of the U-shaped member are brackets 22 which are used to secure the entire assembly to the trailer or motor vehicle, as desired.

In a preferred embodiment of the invention, a replaceable liner 24 of about ¼″ thickness is provided at the tip of the loop 10. This may be spot welded or otherwise secured to the loop at the point noted and when worn by the action of tongue 12 may be replaced. The use of the liner eliminates the need for building up the loop periodically by arc welding to replace the metal worn away in use. Also, the use of the replaceable liner eliminates the possibility of the loop being weakened with use.

The use of a spring which bears directly against the sliding throat piece 16, together with the wedge 20 which in turn bears against the spring, urging it toward the tongue member 12, provides several advantages. When the hitch is in use and the motor vehicle and trailer are in motion, gravity and inertia tend to cause the wedge to be forced snugly into place. However, the use of such an arrangement ensures that even relatively worn tongues may be gripped securely since, unlike most of the structures used heretofore, the throat member 16 has no one fixed, closed position. Also, the use of a resilient member 18 makes possible a certain amount of freedom of motion between tongue 12 and the loop 10. Sliders having fixed, locked positions may provide either insufficient flexibility in the coupling or too loose a juncture.

Obviously, many modifications and variations of this invention may be made without departing from the spirit and scope thereof, and therefore only such limitations should be imposed as are indicated in the appended claims.

I claim:

1. A vehicle coupling comprising: a generally U-shaped member consisting of a base member and two parallel arms integral with said base member; means secured at the extreme end of each of the said arms adapted to be secured to a vehicle; a pair of plates secured one above and one below said pair of arms at a point adjacent the extreme ends thereof, said plates terminating short of the base of the said U-shaped member whereby to form an eye for a trailer tongue, said plates also forming a throat bounded by the inner surfaces of the said arms and the inner surfaces of the said plates; a throat piece slideable within said throat and into the said eye, both of said plates being provided with a passage therethrough normal to the surfaces of said plates and perpendicular to said throat, said passage being at the ends of said plates farthest removed from the said eye, said passage being in the area occupied by the rearmost end of the said throat piece; a wedge of a size adapted to pass partially through the said passage; and a resilient member positioned between said wedge and said rearmost end of said throat piece, said wedge being gripped between the said resilient member and a rear wall of the said passage provided by the said plates.

2. The structure of claim 1 wherein the said base member of the said U-shaped member is provided with a replaceable metal liner temporarily secured thereto within the interior of the said eye whereby a tongue passing through the said eye will bear against the said replaceable liner.

References Cited in the file of this patent
UNITED STATES PATENTS

| | | |
|---|---|---|
| 1,973,766 | Johnson | Sept. 18, 1934 |
| 2,270,569 | Weiss | Jan. 20, 1942 |
| 2,321,535 | Weiss | June 8, 1943 |
| 2,448,744 | Strader | Sept. 7, 1948 |